(12) United States Patent
Itoh et al.

(10) Patent No.: US 9,914,185 B2
(45) Date of Patent: Mar. 13, 2018

(54) ALUMINUM ALLOY BRAZING SHEET

(71) Applicant: UACJ Corporation, Chiyoda-ku, Tokyo (JP)

(72) Inventors: Yasunaga Itoh, Tokyo (JP); Tomoki Yamayoshi, Tokyo (JP)

(73) Assignee: UACJ CORPORATION, Chiyoda-ku, Tokyo (JP)

( * ) Notice: Subject to any disclaimer, the term of this patent is extended or adjusted under 35 U.S.C. 154(b) by 574 days.

(21) Appl. No.: 14/398,889

(22) PCT Filed: May 2, 2013

(86) PCT No.: PCT/JP2013/062753
§ 371 (c)(1),
(2) Date: Nov. 4, 2014

(87) PCT Pub. No.: WO2013/168669
PCT Pub. Date: Nov. 14, 2013

(65) Prior Publication Data
US 2015/0118517 A1    Apr. 30, 2015
US 2015/0321293 A9    Nov. 12, 2015

(30) Foreign Application Priority Data
May 7, 2012   (JP) .................. 2012-105797

(51) Int. Cl.
*B32B 15/01*  (2006.01)
*B23K 35/02*  (2006.01)
(Continued)

(52) U.S. Cl.
CPC .......... *B23K 35/0238* (2013.01); *B23K 1/008* (2013.01); *B23K 1/0012* (2013.01);
(Continued)

(58) Field of Classification Search
None
See application file for complete search history.

(56) References Cited

U.S. PATENT DOCUMENTS 3,627,518 A * 12/1971 Lawrence ............... C22C 21/08
148/437
4,172,181 A   10/1979 Kawase et al.
(Continued)

FOREIGN PATENT DOCUMENTS

JP    51-138562 A   11/1976
JP    52-101651 A    8/1977
(Continued)

OTHER PUBLICATIONS

Search Report of European Patent Office issued in Application No. 13787883 dated Jun. 21, 2016 (14 pages).
International Search Report for PCT/JP2013/062753 (2 pgs.).

*Primary Examiner* — Daniel J Schleis
(74) *Attorney, Agent, or Firm* — Flynn, Thiel, Boutell & Tanis, P.C.

(57) ABSTRACT

An aluminum alloy brazing sheet makes it possible to inexpensively braze aluminum in a nitrogen gas furnace without using flux and a toxic element. The aluminum alloy brazing sheet is used for brazing aluminum in an inert gas atmosphere without using flux, and includes a core material and a filler metal, one side or each side of the core material being clad with the filler metal, the core material being formed of an aluminum alloy that includes 0.2 to 1.3 mass % of Mg, and the filler metal including 6 to 13 mass % of Si and 0.004 to 0.1 mass % of Li, with the balance being aluminum and unavoidable impurities.

8 Claims, 2 Drawing Sheets

(51) Int. Cl.
- *C22C 21/00* (2006.01)
- *B23K 35/28* (2006.01)
- *F28F 21/08* (2006.01)
- *C22C 21/02* (2006.01)
- *C22C 21/04* (2006.01)
- *B23K 1/00* (2006.01)
- *B23K 1/008* (2006.01)
- *B23K 1/012* (2006.01)
- *C22C 21/06* (2006.01)
- *C22C 21/10* (2006.01)
- *B23K 103/10* (2006.01)

(52) U.S. Cl.
CPC .......... *B23K 1/012* (2013.01); *B23K 35/0233* (2013.01); *B23K 35/286* (2013.01); *B23K 35/288* (2013.01); *B32B 15/01* (2013.01); *C22C 21/00* (2013.01); *C22C 21/02* (2013.01); *C22C 21/04* (2013.01); *C22C 21/06* (2013.01); *C22C 21/10* (2013.01); *F28F 21/084* (2013.01); *F28F 21/089* (2013.01); *B23K 2203/10* (2013.01); *Y10T 428/12764* (2015.01)

(56) References Cited

U.S. PATENT DOCUMENTS

| | | | |
|---|---|---|---|
| 5,069,980 A | | 12/1991 | Namba et al. |
| 5,422,191 A | * | 6/1995 | Childree ............ B23K 35/0238 165/905 |
| 5,728,479 A | * | 3/1998 | Childree ............ B23K 35/0238 228/262.51 |
| 6,152,354 A | * | 11/2000 | Childree .............. B23K 35/286 228/206 |
| 8,763,880 B2 | * | 7/2014 | Wittebrood ........ B23K 35/0233 228/246 |
| 2011/0111254 A1 | * | 5/2011 | Wittebrood .......... B23K 35/002 428/654 |

FOREIGN PATENT DOCUMENTS

| | | | |
|---|---|---|---|
| JP | 53-119762 A | | 10/1978 |
| JP | 54-022939 B | | 8/1979 |
| JP | 55-047362 A | | 4/1980 |
| JP | 61-007088 A | | 1/1986 |
| JP | 6-287669 A | | 10/1994 |
| JP | 09-500422 A | | 1/1997 |
| JP | 2000-317674 A | | 11/2000 |
| JP | 2009161826 | * | 7/2009 |

* cited by examiner

UPPER SIDE

LOWER SIDE

ALUMINUM ALLOY BRAZING SHEET

TECHNICAL FIELD

The invention relates to an aluminum alloy brazing sheet.

BACKGROUND ART

A brazing method has been widely used as a method for joining parts having a large number of small joints (e.g., aluminum heat exchanger and machine parts). When brazing aluminum (including an aluminum alloy), it is indispensable to break the oxide film that covers the surface of the material so that the molten filler metal comes in contact with the matrix or another molten filler metal. The oxide film can be broken by utilizing a method that utilizes flux, or a vacuum heating method, for example. These methods have been put to practical use.

The brazing method has been applied to various fields. The brazing method has been most typically applied to automotive heat exchangers. Most of the automotive heat exchangers (e.g., radiator, heater, condenser, and evaporator) are made of aluminum, and produced by applying the brazing method. A method that applies a non-corrosive flux to the material, followed by heating in nitrogen gas is most widely used at present.

In recent years, a heat exchanger provided with electronic parts (e.g., inverter cooler) has been used along with a change in driveline (e.g., electric car and hybrid car), and a flux residue has posed problems. Therefore, some of the inverter coolers are produced using a vacuum brazing method that does not utilize a flux. However, since the vacuum brazing method utilizes a heating furnace, that increases the equipment and maintenance costs, and has problems as to productivity and brazing stability, a brazing method that is implemented in a nitrogen gas furnace without using a flux has been increasingly desired.

For example, a method that utilizes a brazing sheet that is clad with a filler metal to which a small amount of Be is added, and performs an etching treatment in an acid or an alkali, followed by heating for brazing was put to practical use. However, the application range of this method was limited, and this method is rarely used at present. The application range of this method was limited for the following reasons.

(1) Since the brazability is poor as compared with the method that applies flux, brazing failure easily occurs.
(2) A toxic element (i.e., Be) is included in the filler metal even in a small amount.

The problem (1) is a fundamental problem. For example, even if easy brazing (e.g., brazing a fin and a tube) can be performed without a problem, it may be difficult to reliably braze an area where it is necessary to prevent leakage (e.g., an area in which a tube is inserted into a header, or a joint at the outer circumference of a hollow heat exchanger formed using a pressed sheet). Therefore, the application range is limited to a heat exchanger that can be easily brazed (e.g., a stacked-type heat exchanger that is mainly brazed in a plane, or a heat sink that is produced by brazing a fin to a base such as an extruded shape). The problem (2) (i.e., the toxicity of Be) is serious in the fields of food, medical equipment, and automotive heat exchangers, and the above method may generally be rejected for this reason.

A method has been proposed that brazes aluminum members in a non-oxidizing atmosphere without using a flux in a state in which an Al—Si-based filler metal that includes Na, K, or Li is positioned between the aluminum members. However, this method has a problem in that sufficient brazability cannot necessarily be obtained.

RELATED-ART DOCUMENT

Patent Document

Patent Document 1: Japanese Patent No. 994051
Patent Document 2: U.S. Pat. No. 4,173,302

SUMMARY OF THE INVENTION

Technical Problem

The invention was conceived in order to solve the above problems that may occur when using a brazing method that does not utilize a flux. An object of the invention is to provide an aluminum alloy brazing sheet that makes it possible to inexpensively braze aluminum in a nitrogen gas furnace without using a flux and a toxic element.

Solution to Problem (1) An aluminum alloy brazing sheet for brazing aluminum in an inert gas atmosphere without using flux, the brazing sheet including a core material and a filler metal, one side or each side of the core material being clad with the filler metal, the core material being formed of an aluminum alloy that includes 0.2 to 1.3 mass % (hereinafter may be referred to as "%") of Mg, and the filler metal including 6 to 13% of Si and 0.004 to 0.1% of Li, with the balance being aluminum and unavoidable impurities.
(2) The aluminum alloy brazing sheet according to (1), wherein the aluminum alloy that forms the core material includes 0.2 to 1.3% of Mg, with the balance being aluminum and unavoidable impurities.
(3) The aluminum alloy brazing sheet according to (1), wherein the aluminum alloy that forms the core material further includes one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.
(4) An aluminum alloy brazing sheet for brazing aluminum in an inert gas atmosphere without using a flux, the brazing sheet including a core material, an intermediate material, and a filler metal, one side or each side of the core material being clad with the filler metal through the intermediate material, the core material being formed of an aluminum alloy, the intermediate material being formed of an aluminum alloy that includes 0.2 to 1.3% of Mg, and the filler metal including 6 to 13% of Si and 0.004 to 0.1% of Li, with the balance being aluminum and unavoidable impurities.
(5) The aluminum alloy brazing sheet according to (4), wherein the aluminum alloy that forms the intermediate material includes 0.2 to 1.3% of Mg, with the balance being aluminum and unavoidable impurities.
(6) The aluminum alloy brazing sheet according to (4), wherein the aluminum alloy that forms the intermediate material further includes one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.
(7) The aluminum alloy brazing sheet according to any one of (4) to (6), wherein the aluminum alloy that forms the core material includes 0.05 to 1.8% of Mn, with the balance being aluminum and unavoidable impurities.

(8) The aluminum alloy brazing sheet according to any one of (4) to (6), wherein the aluminum alloy that forms the core material includes 0.05 to 1.8% of Mn, and one or more of 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.

(9) The aluminum alloy brazing sheet according to any one of (1) to (8), wherein one side of the core material is clad with the filler metal, and the other side of the core material is clad with a sacrificial anode material, the sacrificial anode material including 0.9 to 6% of Zn, with the balance being aluminum and unavoidable impurities.

(10) The aluminum alloy brazing sheet according to any one of (1) to (9), wherein the filler metal further includes either or both of 0.004 to 0.2% of Bi and 0.05 to 0.4% of Mg.

(11) The aluminum alloy brazing sheet according to any one of (1) to (10), wherein the filler metal further includes either or both of 0.002 to 0.05% of Sr and 0.003 to 0.07% of Sb.

(12) The aluminum alloy brazing sheet according to any one of (1) to (11), wherein the filler metal further includes one or more of 0.05 to 0.8% of Fe, 0.05 to 0.2% of Mn, and 0.01 to 0.15% of Ti.

ADVANTAGEOUS EFFECTS OF THE INVENTION

The invention thus provides an aluminum alloy brazing sheet that makes it possible to inexpensively braze aluminum in a nitrogen gas furnace without using a flux and a toxic element. The aluminum alloy brazing sheet may suitably be used for brazing an automotive heat exchanger or the like for which a stable fillet-forming capability is required.

DESCRIPTION OF EMBODIMENTS

In order to implement fluxless brazing that can achieve a brazability equal to that achieved by brazing using a flux, it is necessary to provide a means that substitutes for the functions of flux. A function of promoting the breakage of an oxide film (hereinafter referred to as "function (1)"), and a function of reducing the surface tension of a molten filler metal (hereinafter referred to as "function (2)") are important as the functions of a flux during brazing. Opinions are divided on the mechanism by which a flux achieves the function (1). It is most likely that the molten flux enters cracks formed in the oxide film (i.e., cracks that occur due to the difference in thermal expansion from the matrix), and removes the oxide film from aluminum.

Molten flux can enter the cracks formed in the oxide film, and remove the oxide film from aluminum since the molten flux has a high wettability with the oxide film ($Al_2O_3$). A flux is used to remove an oxide when casting aluminum due to its high wettability with an oxide. When a small amount of Be is added to the filler metal, Be is diffused over the surface of the filler metal during heating for brazing, and forms BeO on the surface of the filler metal (confirmed by TEM observation). Since Be locally removes oxygen from $Al_2O_3$, the unity of the oxide film deteriorates, and cracks that occur due to the difference in thermal expansion from the matrix become fine. It is considered that the flow of the molten filler metal is thus promoted. An Al—Si filler metal to which about 0.01% of Be is added exhibits a wettability with an aluminum material even when a flux is not applied due to the above oxide film breakage function.

An element having a free energy of formation of oxides that is equal to or less than that of $Al_2O_3$ achieves the oxide film breakage function. Examples of a practical element other than Be include Mg, Ca, Ce, Zr, Sr, Ba, and the like. Since Mg has a special effect (described later), it is desirable to use Mg taking account of the special effect. The inventors proposed use of Ca, Ce, and Zr (see Japanese Patent Application No. 2011-275285), and confirmed that a fillet is formed on a practical joint due to the combined effect with Mg. However, it was found that it is difficult to achieve a stable effect comparable to that of Be when brazing a joint with a high degree of difficulty in brazing. Sr has a low free energy of formation of oxides. However, Sr achieves the oxide film breakage effect to only a small extent when added alone.

In view of the above situation, the inventors focused on Li. The free energy of formation of $Li_2O$ at 600° C. is −970 kJ/mol, which is almost equal to that (−952 kJ/mol) of $Al_2O_3$. Since pure Li metal produces a combustible/flammable gas that may ignite upon contact with water, it is difficult to handle pure Li metal (e.g., it is necessary to immerse pure Li metal in oil during storage). However, it was found that casting can be safely and easily performed by producing an intermediate alloy with aluminum using a special method. An Al—Si alloy and an Al—Li intermediate alloy were cast, and an Al—Si filler metal to which a small amount of Li was added was produced. A spreading test was performed using the resulting products. As a result, it was found that it is possible to obtain a wettability equal to that of an Al—Si filler metal to which a small amount of Be is added.

However, when Li is merely added to an Al—Si filler metal, a practical joining capability such as a clearance filling capability cannot be obtained in the same manner as in the case of adding Be. This is primarily because the function of a flux that removes an oxide film from aluminum cannot be achieved when Li or Be is added. It is physically difficult to achieve the function of removing an oxide film from aluminum by adding an element to the filler metal. However, it is possible to improve the brazability by forming an $Al_2MgO_4$ spinel-type compound in an $Al_2O_3$ oxide film so that the oxide film becomes fragile.

$Al_2MgO_4$ can be formed in the oxide film by adding Mg to the filler metal. However, it is preferable to add Mg to the core material or the intermediate material provided between the core material and the filler metal in order to prevent a situation in which MgO that impairs brazability is formed on the surface of the filler metal during material production and heating for brazing. When Mg is added to the core material or the intermediate material, Mg slowly diffuses inside the filler metal during heating for brazing, and rapidly diffuses toward the surface of the filler metal when the filler metal is melted (i.e., partial melting of an Al—Si—Mg ternary eutectic). Therefore, it is possible to form $Al_2MgO_4$ in the Al$_2$O$_3$ oxide film without forming MgO on the surface of the filler metal, and reliably increase the fragility of the oxide film.

Since Mg has an effect of reducing the surface tension of the molten filler metal (described later), it is effective to add Mg to the core material or the intermediate material (layer) in order to improve the fillet-forming capability when producing a practical joint. It was thus found that the oxide film of the filler metal breaks and is removed by adding Li to the filler metal, and adding Mg to the core material or the intermediate material. JP-A-9-500422 discloses a brazing method using a flux that utilizes a composite formed of a core material that includes 2% or less of Mn, 2% or less of Mg, and the like, and a cladding material formed of an Li-containing filler metal alloy. However, it was found that a prominent effect can be achieved by fluxless brazing that utilizes a brazing sheet that includes a core material that includes a specific amount of Mg, and an Li-containing filler metal.

According to several embodiments of the invention, an aluminum alloy brazing sheet is used for brazing aluminum in an inert gas atmosphere without using a flux. An aluminum alloy brazing sheet according to a first embodiment includes a core material and a filler metal, one side or each side of the core material being clad with the filler metal, the core material being formed of an aluminum alloy that includes 0.2 to 1.3% of Mg, and the filler metal including 6 to 13% of Si and 0.004 to 0.1% of Li, with the balance being aluminum and unavoidable impurities. An aluminum alloy brazing sheet according to a second embodiment includes a core material formed of an aluminum alloy, an intermediate material, and a filler metal, one side or each side of the core material being clad with the filler metal through the intermediate material, the intermediate material being formed of an aluminum alloy that includes 0.2 to 1.3% of Mg, and the filler metal including 6 to 13% of Si and 0.004 to 0.1% of Li, with the balance being aluminum and unavoidable impurities.

The above Si content (6 to 13%) is a practical range for the filler metal. If the Si content is less than 6%, the filler metal may not achieve a sufficient function since the amount of the filler metal may be insufficient, and the fluidity of the filler metal may deteriorate. If the Si content exceeds 13%, the matrix may be melted to a large extent due to excessive filler metal, and coarse primary Si crystals may be easily formed in the filler metal. As a result, a hole may be formed due to melting during brazing.

If the Li content is less than 0.004%, the effect of breaking the oxide film may be insufficient. If the Li content exceeds 0.1%, Li$_2$O may be unnecessarily formed, and brazability may deteriorate. If the Mg content in the core material is less than 0.2%, the effect of breaking the oxide film may be insufficient. If the Mg content in the core material exceeds 1.3%, the melting point of the core material may decrease, and it may be difficult to implement brazing.

An aluminum alloy brazing sheet according to a third embodiment includes the core material, the filler metal, and a sacrificial anode material, one side of the core material being clad with the filler metal, the other side of the core material being clad with the sacrificial anode material, and the sacrificial anode material including 0.9 to 6% of Zn, with the balance being aluminum and unavoidable impurities. If the Zn content in the sacrificial anode material is less than 0.9%, the sacrificial anode effect may be insufficient. If the Zn content in the sacrificial anode material exceeds 6%, the corrosion rate may increase, and the corrosion lifetime may decrease.

The filler metal may further include either or both of 0.004 to 0.2% of Bi and 0.05 to 0.4% of Mg. It is necessary to reduce the surface tension of the molten Al—Si filler metal in order to form a fillet on a practical joint having a clearance so that the clearance is filled with the filler metal in a state in which the wettability of the molten filler metal is improved by breaking the oxide film (or removing the oxide film, or causing the oxide film to become fragile). It is effective to add Mg and Bi in order to reduce the surface tension of the molten filler metal. Mg and Bi can reduce the surface tension of the molten filler when added either alone or in combination. If the Bi content is less than 0.004%, the effect of reducing the surface tension of the filler metal may be insufficient. If the Bi content exceeds 0.2%, the filler metal may be significantly colored, and an improvement in brazability may not be achieved. If the Mg content is less than 0.05%, the effect of reducing the surface tension of the filler metal may be insufficient. If the Mg content exceeds 0.4%, MgO may be formed on the surface of the filler metal, and brazability may be impaired.

The filler metal may further include either or both of 0.002 to 0.05% of Sr and 0.003 to 0.07% of Sb. It is effective to improve the fluidity of the filler metal in order to further improve the fillet-forming capability without increasing the amount of the filler metal and the Si concentration in the filler metal. It is effective to reduce the particle size of Si in the Al—Si filler metal in order to improve the fluidity of the filler metal. The addition of Sr or Sb is a practical means. Sr and Sb refine the Al—Si eutectic structure of the filler metal when added either alone or in combination. If the Sr content is less than 0.002%, the effect of refining the Al—Si eutectic structure of the filler metal may be insufficient. If the Sr content exceeds 0.05%, the effect of refining the Al—Si eutectic structure of the filler metal may be saturated, and the filler metal production cost may increase. If the Sb content is less than 0.003%, the effect of refining the Al—Si eutectic structure of the filler metal may be insufficient. If the Sb content exceeds 0.07%, the clearance filling capability may be adversely affected.

When producing a heat exchanger by brazing, a molten filler metal may move downward due to the effects of gravity, and may not be sufficiently supplied to an upper joint. In particular, the effects of gravity cannot be disregarded when a joint requires a large amount of filler metal. It is effective to increase the viscosity of the molten filler metal in order to reduce the effects of gravity. Fe, Mn, and Ti are effective for increasing the viscosity of the molten filler metal. These elements and precipitates of compounds thereof increase the viscosity of the molten filler metal.

The filler metal may further include one or more of 0.05 to 0.8% of Fe, 0.05 to 0.2% of Mn, and 0.01 to 0.15% of Ti. Fe, Mn, and Ti increase the viscosity of the molten filler metal when added either alone or in combination. If the Fe content, the Mn content, or the Ti content is less than the lower limit, the effect of increasing the viscosity of the molten filler metal may be insufficient. If the Fe content, the Mn content, or the Ti content exceeds the upper limit, the fluidity of the molten filler metal may be adversely affected.

In the first embodiment, it is preferable that the aluminum alloy that forms the core material include 0.2 to 1.3% of Mg, with the balance being aluminum and unavoidable impurities, or include 0.2 to 1.3% of Mg, and one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.

In the second embodiment, it is preferable that the aluminum alloy that forms the intermediate material include 0.2 to 1.3% of Mg, with the balance being aluminum and unavoidable impurities, or include 0.2 to 1.3% of Mg, and one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.

In the second embodiment, it is preferable that the aluminum alloy that forms the intermediate material include 0.2 to 1.3% of Mg, with the balance being aluminum and unavoidable impurities, or include 0.2 to 1.3% of Mg, and one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities.

An aluminum alloy that includes 0.2 to 1.3% of Mg, with the balance being aluminum and unavoidable impurities, corresponds to a 5000 series (Al—Mg-based) alloy, and an aluminum alloy that includes 0.2 to 1.3% of Mg, and one or more of 0.05 to 1.8% of Mn, 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities, corresponds to a 3000 series (Al—Mn-based) alloy, a 5000 series (Al—Mg-based) alloy, a 6000 series (Al—Mg—Si-based) alloy, and a 7000 series (Al—Zn-based) alloy.

An aluminum alloy that includes 0.05 to 1.8% of Mn, with the balance being aluminum and unavoidable impurities, or an aluminum alloy that includes 0.05 to 1.8% of Mn, and one or more of 1.0% or less of Si, 1.0% or less of Fe, 0.9% or less of Cu, 6.5% or less of Zn, 0.2% or less of Ti, and 0.5% or less of Zr, with the balance being aluminum and unavoidable impurities, corresponds to a 3000 series (Al—Mn-based) alloy and a 7000 series (Al—Zn-based) alloy.

EXAMPLES

The invention is further described below by way of examples and comparative examples to demonstrate the advantageous effects of the invention. Note that the following examples are for illustration purposes only, and the invention is not limited to the following examples.

Example 1

A core material was produced by casting an ingot using a continuous casting method, and machining the ingot to a given thickness. A filler metal was produced by casting an ingot, and hot-rolling the ingot to a given thickness. The filler metal was stacked on one side of the core material, followed by hot rolling and cold rolling to produce an aluminum alloy brazing sheet (two-layer material) having a thickness of 0.4 mm (Specimens 1 to 20). The composition of the core material and the filler metal is shown in Table 1.

Comparative Example 1

A core material was produced by casting an ingot using a continuous casting method, and machining the ingot to a given thickness. A filler metal was produced by casting an ingot, and hot-rolling the ingot to a given thickness. The filler metal was stacked on one side of the core material, followed by hot rolling and cold rolling to produce an aluminum alloy brazing sheet (two-layer material) having a thickness of 0.4 mm (Specimens 26 to 40). The composition of the core material and the filler metal is shown in Table 2.

Example 2

A core material was produced by casting an ingot using a continuous casting method, and machining the ingot to a given thickness. A filler metal, an intermediate material, and a sacrificial anode material were produced by casting an ingot, and hot-rolling the ingot to a given thickness. The filler metal was stacked on one side of the core material through the intermediate material, followed by hot rolling and cold rolling to produce a brazing sheet (three-layer material) having a thickness of 0.4 mm (Specimens 21 to 23). The filler metal was stacked on one side of the core material through the intermediate material, and the sacrificial anode material was stacked on the other side of the core material, followed by hot rolling and cold rolling to produce a brazing sheet (four-layer material) having a thickness of 0.4 mm (Specimens 24 and 25). The composition of the core material, the filler metal, the intermediate material, and the sacrificial anode material is shown in Table 3.

The resulting aluminum alloy brazing sheets were subjected to a clearance filling test and a cup test according to the following methods.

Clearance Filling Test

Figure 1:
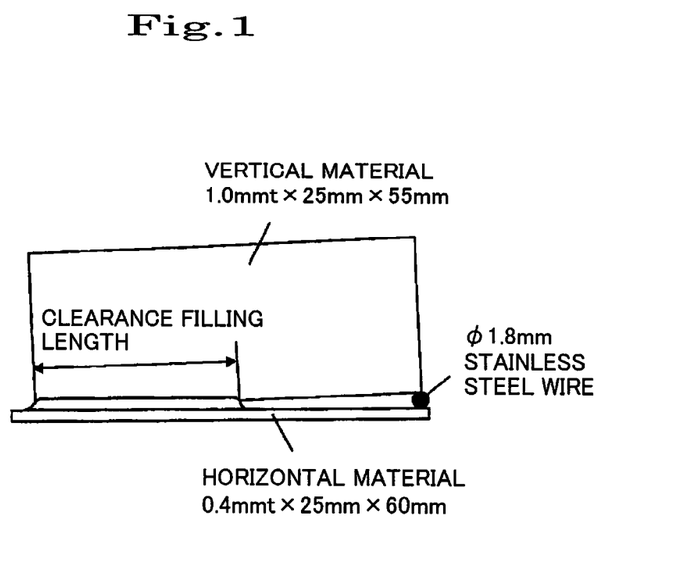
FIG. 1 is a view illustrating a clearance filling test specimen.

The brazing sheet was degreased, and etched using a weak acid. A 3003 alloy sheet (thickness: 1 mm) (vertical material) was assembled with the brazing sheet (horizontal material) to prepare a clearance filling test specimen illustrated in FIG. 1. A nitrogen gas furnace (double chamber furnace) including a preheating chamber (internal volume: 0.4 m$^3$) and a brazing chamber was used. The clearance filling test specimen was placed in the brazing chamber, and brazed at a maximum temperature of 595° C. Nitrogen gas was fed to each chamber of the nitrogen gas furnace at a flow rate of 20 m$^3$/h, and the temperature was increased from 450° C. to 595° C. within about 12 minutes. The oxygen concentration in the brazing chamber after completion of heating was 7 to 17 ppm. When the temperature of the clearance filling test specimen placed in the brazing chamber reached 595° C., the clearance filling test specimen was transferred to the preheating chamber, cooled to 550° C., removed from the preheating chamber, and allowed to cool in the air.

Cup Test

Figure 2:
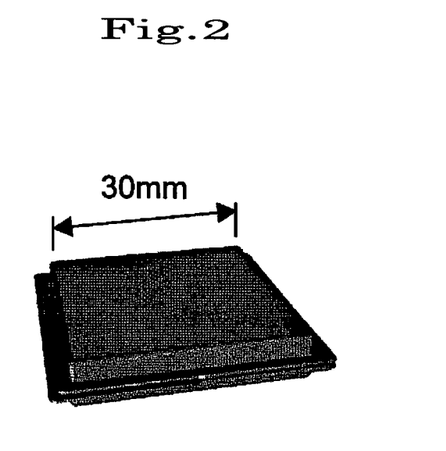
FIG. 2 is a view illustrating the external appearance of a cup test specimen.
Figure 3:
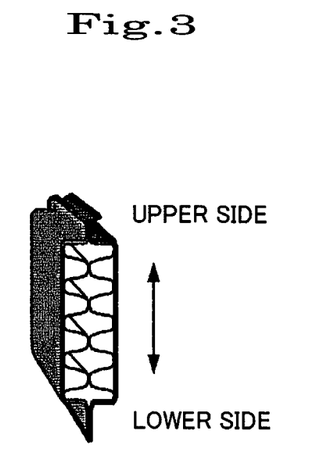
FIG. 3 is a view illustrating the state of a cup test specimen during brazing.

The brazing sheet was pressed so that the filler metal was positioned on the inner side, degreased, and etched using a weak acid. A 3003 alloy material (thickness: 0.1 mm) that was formed in the shape of a fin and degreased, was placed therein to prepare a cup test specimen (30 30 10 mm (thickness)) illustrated in FIG. 2. The cup test specimen was heated during brazing in the state illustrated in FIG. 3 in order to simulate the adverse effects of gravity. The cup test specimen was placed in the same furnace as that used for the clearance filling test. Nitrogen gas was fed to each chamber at a flow rate of 20 m$^3$/h, and the temperature was increased from 450° C. to 595° C. within about 14 minutes. The oxygen concentration in the brazing chamber after completion of heating was 6 to 15 ppm. When the temperature of the cup test specimen placed in the brazing chamber reached 595° C., the cup test specimen was transferred to the preheating chamber, cooled to 550° C., removed from the preheating chamber, and allowed to cool in the air.

The clearance filling length of the clearance filling test specimen was measured after brazing to evaluate the fillet-forming capability. A case where the clearance filling length was 25 mm or more was evaluated as "Acceptable" (practical level). The flow factor was calculated by the following expression.

Flow factor K=volume of fillet formed/volume of filler metal of horizontal material A fillet on the upper side of the periphery of the cup test specimen was observed with the naked eye and using a stereoscopic microscope, and evaluated as described below.
A: A uniform fillet was formed over the total length.
B: A fillet was formed over the total length, but was rather small.
C: A fillet was formed over the total length, but broke in part.
D: A fillet broke at a plurality points.
E: A fillet was not formed.

When using the brazing sheets (two-layer materials) (Specimens 1 to 20) according to the invention, a fillet having a clearance filling length of 26 to 37 mm was formed during the clearance filling test (i.e., Specimens 1 to 20 showed a sufficiently practical fillet-forming capability). The clearance filling length reached the practical level when Li was added to the filler metal, and Mg was added to the core material.

When using the brazing sheets (three-layer materials) (Specimens 21 to 23) and the brazing sheets (four-layer materials) (Specimens 24 and 25) according to the invention, a fillet having a clearance filling length of 26 to 30 mm was formed during the clearance filling test (i.e., Specimens 21 to 25 showed a sufficiently practical fillet-forming capability). A similar effect was observed when Mg (having an effect of increasing the fragility of the oxide film) was added to the intermediate material. A similar effect was also observed when one side of the core material was clad with the sacrificial anode material.

When Bi or Mg was added to the filler metal, the flow factor increased to only a small extent, but the clearance filling length increased, and a fillet was sufficiently formed on the upper side of the periphery of the cup test specimen. It is considered that the above results were obtained since the surface tension of the molten filler metal decreased due to the addition of Bi or Mg (Specimens 4 to 8).

When Sr or Sb was added to the filler metal, the flow factor increased by 5 to 10%, and the clearance filling length also increased (Specimens 9 to 13). When Fe, Mn, or Ti was added to the filler metal, a fillet was uniformly formed on the upper side of the periphery of the cup test specimen. It is considered that the above results were obtained since the effects of gravity were canceled due to an increase in the viscosity of the molten filler metal (Specimens 14 to 20).

When using the brazing sheet in which the core material formed of an Al—Mn alloy was clad with the filler metal formed of an Al—Si alloy that did not include Li, the clearance filling length was 6 mm (i.e., brazability was significantly poor), and no fillet was formed in the cup test (Specimen 26).

When Li was added to the filler metal, and Mg was not added to the core material (Specimen 27), when Mg was added to the core material, and Li was not added to the filler metal (Specimen 28), and when Mg was added to the filler metal, and Mg was not added to the core material (Specimen 29), the brazability was improved as compared with Specimen 26 in which the core material formed of an Al—Mn alloy was clad with the filler metal formed of an Al—Si alloy. However, the clearance filling length was as small as 22 mm or less.

When using the brazing sheet (Specimen 30) in which Bi and Be were added to the filler metal, and the brazing sheet (Specimen 31) in which Bi and Be were added to the filler metal, and Mg was added to the core material, the clearance filling length was 25 mm or more. However, these brazing sheets are not suitable for practical use since the filler metal includes Be (i.e., a toxic element).

When the Li content in the filler metal was low (Specimen 32), or when the Li content in the filler metal was high (Specimen 33), the clearance filling length was less than 25 mm. When the Mg content in the core material was low (Specimen 34), the clearance filling length was less than 25 mm.

When only Bi was added to the filler metal (Specimen 35), the effect of breaking the oxide film was insufficient, and brazability was poor. When Li and Bi were added to the filler metal, and Mg was added to the core material, the brazability decreased to some extent, and significant coloration was observed when the Bi content was too high (Specimen 36). When Li and Mg were added to the filler metal, and Mg was added to the core material, the brazability decreased when the Mg content in the filler metal was too high (Specimen 37).

When Li and Sr were added to the filler metal, and Mg was added to the core material, an improvement in brazability was not observed even when the Sr content in the filler metal was more than 0.05% (Specimen 38). In this case, the material cost merely increases. When Li and Sb were added to the filler metal, and Mg was added to the core material, the brazability decreased when the Sb content in the filler metal was too high (Specimen 39). When Li, Bi, Sr, and Sb were added to the filler metal, and Mg was added to the core material, the brazability decreased when the Fe content, the Mn content, and the Ti content in the filler metal were too high (Specimen 40).

TABLE 1

| Specimen | Component (mass %) | | | | | | | | | | | | Thickness (μm) | | Flow factor K | Clearance filling length (mm) | Brazing state on upper side of cup |
|---|---|---|---|---|---|---|---|---|---|---|---|---|---|---|---|---|---|
| | Filler metal | | | | | | | | | | Core material | | Filler metal | Core material | | | |
| | Si | Li | Bi | Sr | Sb | Mg | Fe | Mn | Ti | Be | Mn | Mg | | | | | |
| 1 | 10 | 0.004 | | | | | | | | | 1.2 | 1.29 | 60 | 340 | 0.45 | 28 | C to B |
| 2 | 10 | 0.05 | | | | | | | | | 1.2 | 0.2 | 60 | 340 | 0.47 | 29 | C to B |
| 3 | 10 | 0.11 | | | | | | | | | 1.2 | 0.62 | 60 | 340 | 0.49 | 31 | C to B |
| 4 | 10 | 0.05 | 0.004 | | | | | | | | | 0.62 | 60 | 340 | 0.47 | 32 | B |
| 5 | 10 | 0.05 | 0.2 | | | | | | | | | 0.62 | 60 | 340 | 0.48 | 33 | B |
| 6 | 10 | 0.05 | | | | 0.05 | | | | | | 0.62 | 60 | 340 | 0.47 | 33 | B |
| 7 | 10 | 0.05 | | | | 0.41 | | | | | | 0.62 | 60 | 340 | 0.47 | 33 | B |
| 8 | 10 | 0.05 | 0.03 | | | 0.15 | | | | | | 0.62 | 60 | 340 | 0.48 | 34 | B |
| 9 | 10 | 0.05 | 0.03 | 0.002 | | | | | | | | 0.62 | 60 | 340 | 0.51 | 36 | B |

TABLE 1-continued

| | Component (mass %) | | | | | | | | | | | Thickness (μm) | | Flow | Clearance filling | Brazing state |
| | Filler metal | | | | | | | | | | Core material | Filler | Core | factor | length | on upper |
| Specimen | Si | Li | Bi | Sr | Sb | Mg | Fe | Mn | Ti | Be | Mn | Mg | metal | material | K | (mm) | side of cup |
|---|---|---|---|---|---|---|---|---|---|---|---|---|---|---|---|---|---|
| 10 | 10 | 0.05 | 0.03 | 0.05 | | | | | | | | 0.62 | 60 | 340 | 0.52 | 36 | B |
| 11 | 10 | 0.05 | 0.03 | | 0.003 | | | | | | | 0.62 | 60 | 340 | 0.51 | 35 | B |
| 12 | 10 | 0.05 | 0.03 | | 0.07 | | | | | | | 0.62 | 60 | 340 | 0.5 | 35 | B |
| 13 | 10 | 0.05 | 0.03 | 0.006 | 0.009 | | | | | | | 0.62 | 60 | 340 | 0.53 | 37 | B |
| 14 | 10 | 0.05 | 0.03 | 0.006 | 0.009 | 0.05 | | | | | | 0.62 | 60 | 340 | 0.52 | 35 | A |
| 15 | 10 | 0.05 | 0.03 | 0.006 | 0.009 | 0.8 | | | | | | 0.62 | 60 | 340 | 0.51 | 34 | A |
| 16 | 10 | 0.05 | 0.03 | 0.006 | 0.009 | | | 0.05 | | | | 0.62 | 60 | 340 | 0.52 | 34 | A |
| 17 | 10 | 0.05 | 0.03 | 0.006 | 0.009 | | | 0.19 | | | | 0.62 | 60 | 340 | 0.52 | 33 | A |
| 18 | 10 | 0.05 | 0.03 | 0.006 | 0.009 | | | | 0.01 | | | 0.62 | 60 | 340 | 0.53 | 34 | A |
| 19 | 10 | 0.05 | 0.03 | 0.006 | 0.009 | | | | 0.15 | | | 0.62 | 60 | 340 | 0.52 | 34 | A |
| 20 | 10 | 0.05 | 0.03 | 0.006 | 0.009 | | 0.4 | 0.09 | 0.05 | | | 0.62 | 60 | 340 | 0.52 | 33 | A |

TABLE 2

| | Component (mass %) | | | | | | | | | | | Thickness (μm) | | Flow | Clearance filling | Brazing state |
| | Filler metal | | | | | | | | | | Core material | Filler | Core | factor | length | on upper |
| Specimen | Si | Li | Bi | Sr | Sb | Mg | Fe | Mn | Ti | Be | Mn | Mg | metal | material | K | (mm) | side of cup |
|---|---|---|---|---|---|---|---|---|---|---|---|---|---|---|---|---|---|
| 26 | 10 | | | | | | | | | | 1.2 | | 60 | 340 | — | 6 | E |
| 27 | 10 | 0.05 | | | | | | | | | 1.2 | | 60 | 340 | 0.31 | 22 | C |
| 28 | 10 | | | | | | | | | | 1.2 | 0.62 | 60 | 340 | 0.28 | 20 | D |
| 29 | 10 | | | | | 0.20 | | | | | 1.2 | | 60 | 340 | 0.27 | 18 | D |
| 30 | 10 | | 0.02 | | | | | | | 0.01 | 1.2 | | 60 | 340 | 0.39 | 25 | C |
| 31 | 10 | | 0.02 | | | | | | | 0.01 | 1.2 | 0.62 | 60 | 340 | 0.45 | 29 | C to B |
| 32 | 10 | 0.002 | | | | | | | | | 1.2 | 0.62 | 60 | 340 | 0.29 | 20 | D |
| 33 | 10 | 0.16 | | | | | | | | | 1.2 | 0.62 | 60 | 340 | 0.37 | 24 | C |
| 34 | 10 | 0.05 | | | | | | | | | 1.2 | 0.11 | 60 | 340 | 0.37 | 23 | C |
| 35 | 10 | | 0.02 | | | | | | | | 1.2 | | 60 | 340 | — | 11 | D |
| 36 | 10 | 0.004 | 0.25 | | | | | | | | | 0.62 | 60 | 340 | 0.36 | 24 | C |
| 37 | 10 | 0.004 | | | | 0.61 | | | | | | 0.62 | 60 | 340 | 0.35 | 23 | C |
| 38 | 10 | 0.004 | | 0.07 | | | | | | | | 0.62 | 60 | 340 | 0.51 | 35 | B |
| 39 | 10 | 0.004 | | | 0.1 | | | | | | | 0.62 | 60 | 340 | 0.33 | 22 | C |
| 40 | 10 | 0.05 | 0.03 | 0.006 | 0.009 | | 1.1 | 0.29 | 0.2 | | | 0.62 | 60 | 340 | 0.41 | 27 | C to B |

TABLE 3

| | Component (mass %) | | | | | Thickness (μm) | | | | Flow | Clearance filling | Brazing state |
| | Filler metal | Intermediate material | Core material | | Sacrificial anode material | Filler | Intermediate | Core | Sacrificial anode | factor | length | on upper |
| Specimen | Si | Li | Mg | Mn | Mg | Zn | metal | material | material | material | K | (mm) | side of cup |
|---|---|---|---|---|---|---|---|---|---|---|---|---|---|
| 21 | 10 | 0.004 | 1.29 | 1.2 | | | 60 | 50 | 290 | | 0.44 | 27 | C to B |
| 22 | 10 | 0.004 | 0.20 | | | | 60 | 50 | 290 | | 0.44 | 26 | C to B |
| 23 | 10 | 0.004 | 0.62 | | | | 60 | 50 | 290 | | 0.45 | 28 | C to B |
| 24 | 10 | 0.05 | 0.62 | | | 0.9 | 60 | 50 | 240 | 50 | 0.48 | 30 | B |
| 25 | 10 | 0.05 | 0.62 | | | 6.0 | 60 | 50 | 240 | 50 | 0.44 | 29 | B |

The invention claimed is:

1. An aluminum alloy brazing sheet for brazing aluminum in an inert gas atmosphere without using flux, the brazing sheet comprising a core material, an intermediate material, and a filler metal, one side or each side of the core material being clad with the filler metal through the intermediate material, the core material being formed of an aluminum alloy, the intermediate material being formed of an aluminum alloy that includes 0.2 to 1.3 mass % of Mg, with the balance being aluminum and unavoidable impurities and the filler metal including 6 to 13 mass % of Si and 0.004 to 0.1 mass % of Li, with the balance being aluminum and unavoidable impurities, wherein the aluminum alloy that forms the intermediate material includes 0.2 to 1.3 mass % of Mg, and further includes one or more of 0.05 to 1.8 mass % of Mn, 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

2. The aluminum alloy brazing sheet according to claim 1, wherein the aluminum alloy that forms the core material includes 0.05 to 1.8 mass % of Mn, and one or more of 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

3. The aluminum alloy brazing sheet according to claim 1, wherein the aluminum alloy that forms the core material includes 0.05 to 1.8 mass % of Mn, and one or more of 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

4. The aluminum alloy brazing sheet according to claim 1, wherein the filler metal further includes one or more of 0.004 to 0.2 mass % of Bi, 0.05 to 0.4 mass % of Mg, 0.002 to 0.05 mass % of Sr and 0.003 to 0.07 mass % of Sb, 0.05 to 0.8 mass % of Fe, 0.05 to 0.2 mass % of Mn, and 0.01 to 0.15 mass % of Ti.

5. An aluminum alloy brazing sheet for brazing aluminum in an inert gas atmosphere without using flux, the brazing sheet comprising a core material, an intermediate material, a filler metal and a sacrificial anode material, wherein one side of the core material being clad with the filler metal through the intermediate material, and the other side of the core material is clad with a sacrificial anode material, the core material being formed of an aluminum alloy, the intermediate material being formed of an aluminum alloy that includes 0.2 to 1.3 mass % of Mg, with the balance being aluminum and unavoidable impurities, the filler metal including 6 to 13 mass % of Si and 0.004 to 0.1 mass % of Li, with the balance being aluminum and unavoidable impurities, and the sacrificial anode material including 0.9 to 6 mass % of Zn, with the balance being aluminum and unavoidable impurities, wherein the aluminum alloy that forms the intermediate material includes 0.2 to 1.3 mass % of Mg, and further includes one or more of 0.05 to 1.8 mass % of Mn, 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

6. The aluminum alloy brazing sheet according to claim 5, wherein the aluminum alloy that forms the core material includes 0.05 to 1.8 mass % of Mn, and one or more of 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

7. The aluminum alloy brazing sheet according to claim 5, wherein the aluminum alloy that forms the core material includes 0.05 to 1.8 mass % of Mn, and one or more of 1.0 mass % or less of Si, 1.0 mass % or less of Fe, 0.9 mass % or less of Cu, 6.5 mass % or less of Zn, 0.2 mass % or less of Ti, and 0.5 mass % or less of Zr, with the balance being aluminum and unavoidable impurities.

8. The aluminum alloy brazing sheet according to claim 5, wherein the filler metal further includes one or more of 0.004 to 0.2 mass % of Bi, 0.05 to 0.4 mass % of Mg, 0.002 to 0.05 mass % of Sr and 0.003 to 0.07 mass % of Sb, 0.05 to 0.8 mass % of Fe, 0.05 to 0.2 mass % of Mn, and 0.01 to 0.15 mass % of Ti.

\* \* \* \* \*